June 7, 1960 J. H. GILSON ET AL 2,939,511
PIVOTING SEAT
Filed Jan. 17, 1955 4 Sheets-Sheet 1

INVENTORS
Joseph H. Gilson &
BY Victor M. Teerlinck
Paul Fitzpatrick
ATTORNEY

June 7, 1960

J. H. GILSON ET AL 2,939,511

PIVOTING SEAT

Filed Jan. 17, 1955

INVENTORS
Joseph H. Gilson &
BY Victor M. Teerlinck
Paul Fitzpatrick
ATTORNEY

United States Patent Office 2,939,511
Patented June 7, 1960

2,939,511
PIVOTING SEAT

Joseph H. Gilson, Warren, and Victor M. Teerlinck, St. Clair Shores, Mich., assignors to General Motors Corporation, Detroit, Mich., a corporation of Delaware Filed Jan. 17, 1955, Ser. No. 482,222

3 Claims. (Cl. 155—5)

This invention relates to a pivoting seat for a vehicle, and more particularly to a seat which pivots about an axis which tilts from the vertical.

One feature of the invention is that it provides an improved pivoting seat; another feature of the invention is that it provides a vehicle seat which is mounted for pivotal movement about an axis which tilts from the vertical; a further feature of the invention is that the axis about which the seat pivots passes through the rear portion of the seat so that as the seat swings from its normal forward position to its side position, the seat cushion is lowered, thereby facilitating ingress to and egress from the vehicle; a further feature of the invention is that the axis about which the seat pivots tilts rearwardly and outwardly from the vertical, preferably forming an angle of about 2½ degrees with the vertical; and still another feature of the invention is that it provides a pivoting seat for an automobile, including a floor support having an upwardly facing pivot surface, a seat support having a complementary downwardly facing pivot surface and being mounted on the floor support for pivotal movement on an axis which tilts from the vertical, and a seat mounted on the seat support.

Other features and advantages of the invention will be apparent from the following description and from the drawings, in which.

A pivoting bucket type seat is particularly advantageous in an automobile having a low roof. Pivoting the seat from its normal forward terminal position to a side terminal position facing toward the door of the car facilitates ingress to and egress from the car without necessity for the occupant to stoop as he enters or leaves the car. The lower the roof of the car, the more advantageous is such a pivoting seat.

We have devised and are herewith disclosing and claiming an improved pivoting seat which, by virtue of novel mounting means, is automatically lowered as it pivots from its normal forward position to a side position where it faces toward the plane of the door. By mounting the seat for pivotal movement about an inclined axis which tilts rearwardly and outwardly from the vertical and which preferably forms an angle of about 2½ degrees with the vertical, and by mounting the seat so that the axis passes through the rear central portion of the seat, means are provided whereby the seat is lowered about one inch as it swings from its forward terminal position to its side terminal position. The supporting cushion surface of the seat lies in a normal seating position when the seat faces forwardly, and the cushion is tilted with respect to the floor of the vehicle as the seat swings to its side terminal position to provide a "dumping" effect to facilitate egress of the seat occupant from the vehicle.

Figure 1:
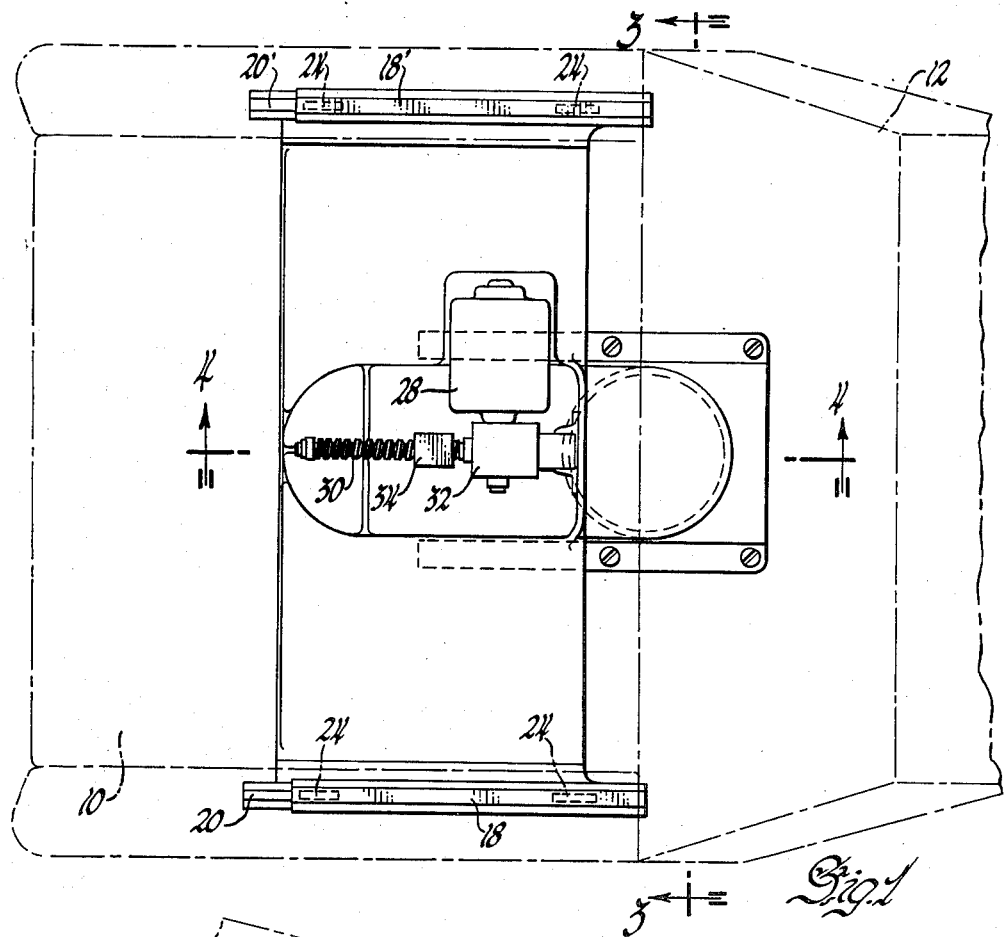
Fig. 1 is a top plan view, partly in section, of the improved seat, the seat cushion and seat back being shown diagrammatically in broken lines.
Figure 2:
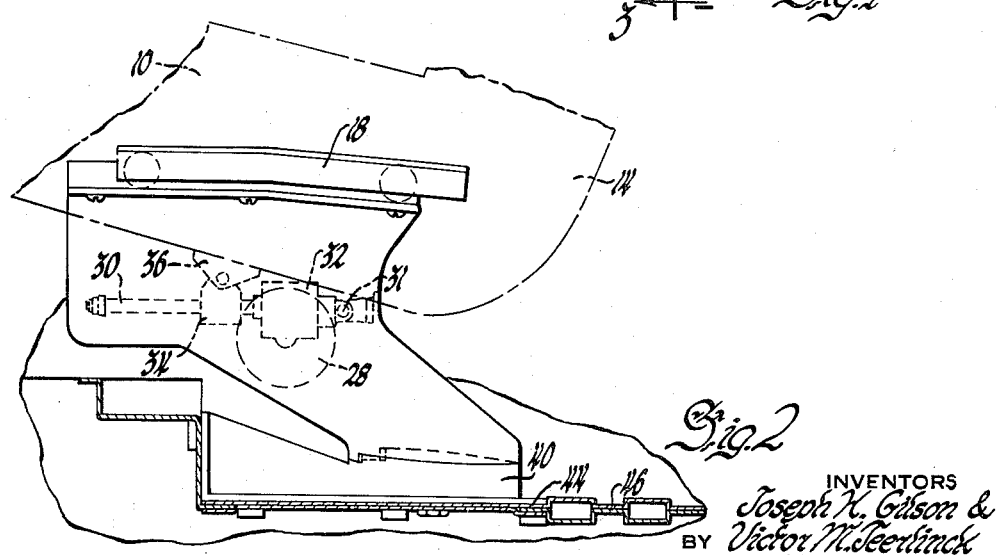
Fig. 2 is a fragmentary side elevational view of the pivoting seat, underlying parts being shown in broken lines, and the seat cushion and seat back being shown in broken lines.
Figure 3:
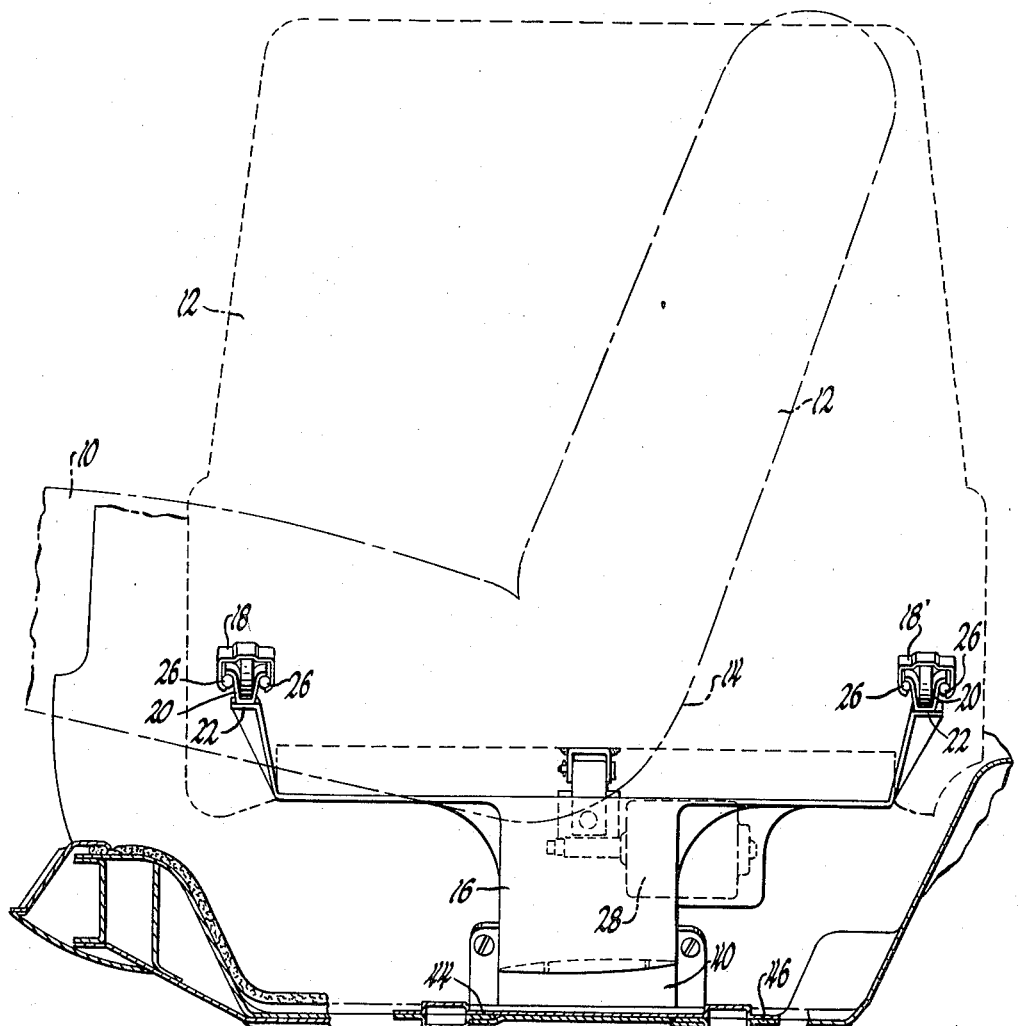
Fig. 3 is a transverse vertical section taken along the line 3—3 of Fig. 1, the seat being shown in one terminal position in broken lines and in another terminal position in dotted lines.

Referring now more particularly to the drawings, the seat shown in Figs. 1, 2 and 3 is of the so-called bucket type, having a cushioned seating portion 10 and a generally vertical backrest portion 12, the portions 10 and 12 being carried in a unitary frame 14. Since the seat and frame are of conventional construction, they are illustrated only diagrammatically in the drawings.

The seat frame 14 is mounted upon a seat support pedestal 16, and means are provided for moving the seat longitudinally on this pedestal. The longitudinal seat adjusting means which is of conventional and well known construction, comprises inverted upper channel members 18 and 18′, one of these members being bolted or otherwise rigidly secured to the bottom of the seat frame at each opposite side thereof. The upper channels 18 and 18′ mate with bottom channels 20 and 20′, respectively, these bottom channels being bolted to support flanges 22 at opposite sides of the seat support pedestal 16. Rollers 24 (see Fig. 1) are mounted between the upper and lower seat adjuster channels at locations near the front and rear of the seat at each side thereof, and balls 26 (see Fig. 3) are carried between overlapping flanges of the upper and lower channels to allow easy rolling movement of the seat along the seat support pedestal 16.

Figure 4:
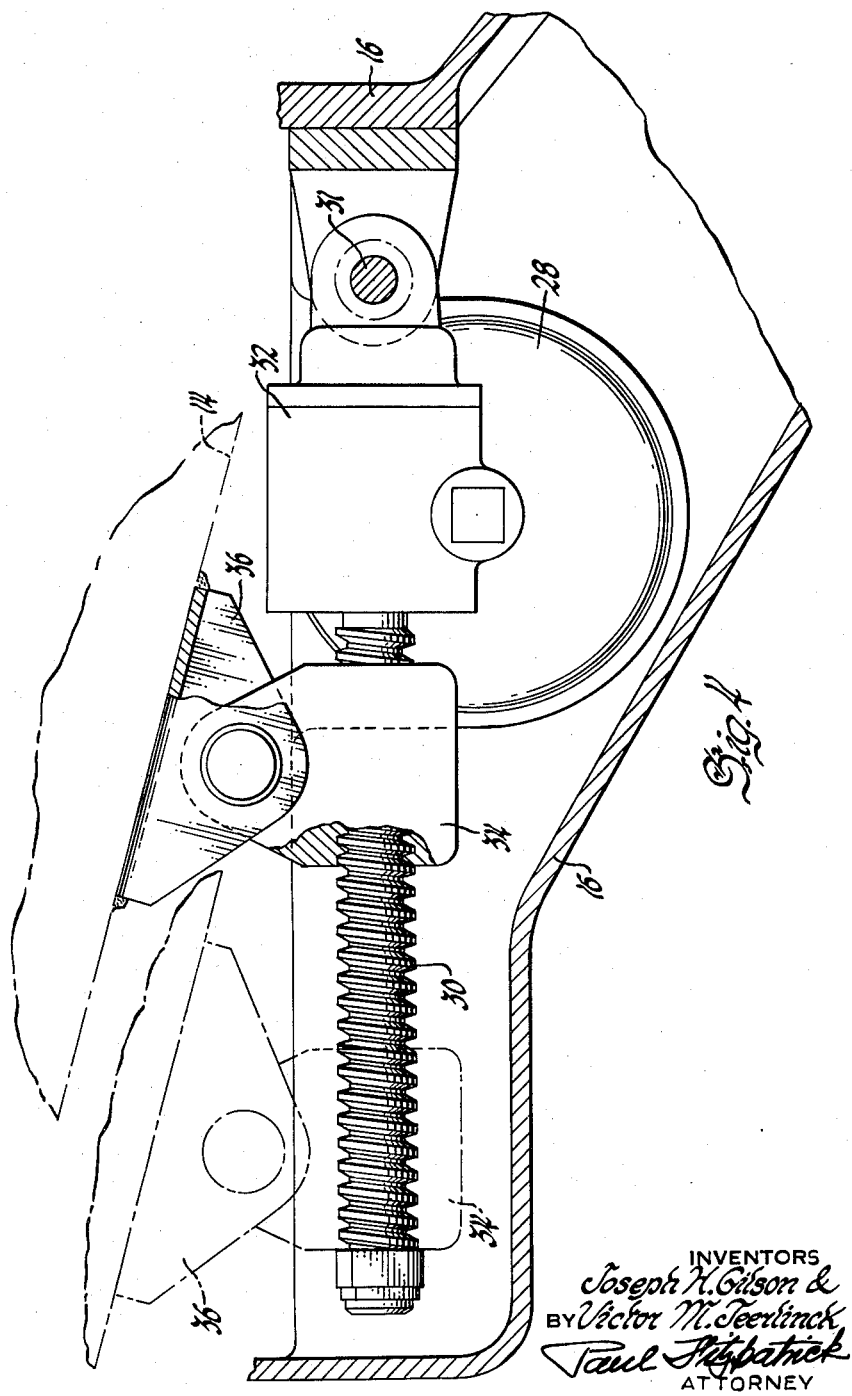
Fig. 4 is an enlarged detail section taken along the line 4—4 of Fig. 1 and showing the motor means for moving the seat longitudinally.

Figs. 1, 2 and 4 show motor means for obtaining longitudinal adjustment. A reversible electric motor 28 is mounted in the pedestal 16 below the seat, and extending longitudinally of the seat at the center thereof is a screw jack 30 which is pivotally connected to the pedestal 16 by a bolt 31 and which is coupled to the motor shaft in a gear box 32. A nut 34 on the screw jack is pivotally connected to a bracket 36 which depends from the seat frame. Fig. 4 shows the two terminal positions of longitudinal adjustment. Operation of the motor 28 turns the screw jack 30 to move the nut 34 to a selected longitudinal position. The motor may be connected to the battery of the automobile in conventional manner by a circuit including switch means.

The seat support pedestal 16 is mounted for pivotal movement about an axis which tilts rearwardly and outwardly from the vertical upon a floor support 40 which is secured by bolts 42 to the floor 44 of the automobile, a reinforcement plate 46 being mounted below the floor. The terms "rearwardly" and "outwardly" are defined as being measured in a direction extending upwardly from the vehicle floor toward the seat.

Figure 5:
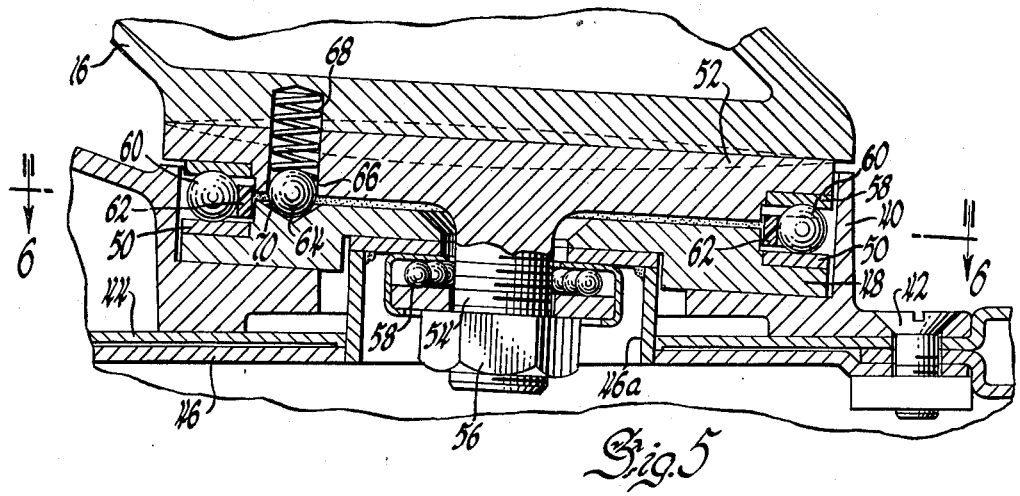
Fig. 5 is an enlarged section through the pivotal mounting means for the seat, being taken along the line 5—5 of Fig. 6.

As shown in Fig. 5, the floor support 40 has a central upwardly open recess in which is seated a race support 48 carrying at its periphery a circular lower race member 50. As may be seen in Figs. 2, 3 and 5, the axis of the race is tilted rearwardly and outwardly, preferably forming an angle of the order of 2½ degrees with the vertical.

The seat support pedestal 16 has secured to its lower surface a hub 52 having a threaded shank 54 which projects downwardly through a central bore in the race support 48 and into a recess 46a formed in the reinforcement plate 46. A nut 56 is threaded on the shank 54 to hold the pedestal 16 and the hub 52 against longitudinal displacement on the floor support 40. This nut is formed with a thrust bearing, including antifriction balls 60 to permit pivoting movement of the hub 52.

At the periphery of the circular hub 52 there is a circular upper race 58 which is complementary to the lower race 50. A plurality of balls 60, which are held in a bearing spacer 62 provide antifriction means for mounting the seat for pivotal movement about a tilting axis.

Figure 6:
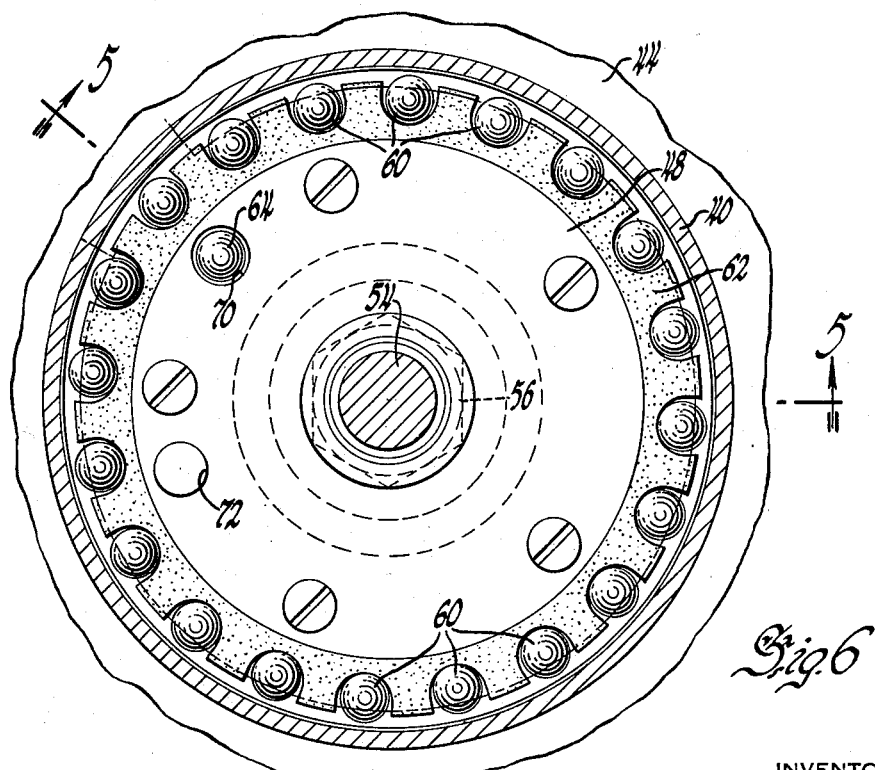
Fig. 6 is a horizontal section through the seat mounting means, being taken along the line 6—6 of Fig. 5.

The seat is releasably held in either a forwardly facing terminal position or a side terminal position in which the seat faces toward the plane of the door opening by a spring-pressed ball and detent arrangement including a ball 64 carried in a recess 66 in the hub 52. The ball is pressed downwardly by a compression spring 68 and the ball seats in either one of two detents 70 or 72 (see Fig. 6) to define the terminal positions of the seat. If desired, positive latch means may be provided to hold the seat in its forward position. The copending application of Delbert C. Probst, filed January 17, 1955, as S.N. 482,221, and entitled "Latching Means for a Vehicle Seat," now Patent No. 2,874,993, shows such a positive latch.

As seen in Figs. 1, 2 and 3, the seat supporting pedestal 16 extends downwardly and rearwardly below the seat so that the ball race upon which the seat pivots is located at the rear central portion of the seat cushion, the major portion of the seat cushion being forwardly of the axis about which the seat pivots. By virtue of this arrangement the tilting axis passes through the rear central portion of the seat cushion. Since the seat pivots about an axis which is tilted rearwardly and outwardly from the vertical and which passes through the rear central portion of the seat cushion, the seat cushion is lowered as the seat swings from its forward terminal position toward its side terminal position.

In one embodiment of the invention which has been constructed, the axis about which the seat pivots is tilted rearwardly and outwardly, forming an angle of 2½ degrees with the vertical, and the seat cushion is lowered one inch as it moves from its front terminal position to its side terminal position. When facing forwardly, the seat cushion lies in a normal and conventional seating plane which is not normal to the tilting axis, and the seat is tilted as it pivots to provide a "dumping" effect while the seat cushion as a whole is lowered.

Because the seat is lowered about one inch as it is pivoted to its side position, extreme ease of access to the automobile is provided, and it is not necessary for the occupant to stoop while entering or leaving the car despite the fact that the car may have an unusually low roof.

While we have shown and described one embodiment of our invention, it is capable of many modifications. Changes, therefore, in the construction and arrangement may be made without departing from the spirit and scope of the invention as set forth in the appended claims.

We claim:

1. A pivoting seat for a vehicle, comprising: a floor support having an upwardly facing ball race, the axis of which is tilted rearwardly and laterally from the vertical; a seat support having a complementary downwardly facing ball race; a seat mounted on said seat support; antifriction means for mounting said seat support on said floor support for pivotal movement about an angularly fixed axis which tilts from the vertical; and means for releasably holding the seat support in either of two terminal positions on the floor support.

2. A pivoting seat for a vehicle, comprising: a floor support having an upwardly facing ball race, the axis of which is tilted rearwardly and laterally from the vertical, said axis forming an angle of the order of 2½ degrees with the vertical; a seat support having a complementary ball race; a seat mounted on said seat support; antifriction means for mounting said seat support on said floor support for pivotal movement about said axis; and spring-pressed ball and detent means for releasably holding the seat support in either of two terminal positions on said floor support.

3. A pivoting seat for a vehicle, comprising: a floor support having an upwardly facing ball race, the axis of which is tilted rearwardly and laterally from the vertical; a seat support having a complementary ball race; a seat mounted on said seat support; antifriction means for mounting said seat support on said floor support for pivotal movement about said axis; and spring pressed ball and detent means for releasably holding the seat support in either of two terminal positions on said floor support.

References Cited in the file of this patent

UNITED STATES PATENTS

| Number | Name | Date |
|---|---|---|
| 144,441 | Cartwright | Nov. 11, 1873 |
| 911,893 | Massey | Feb. 9, 1909 |
| 1,275,624 | Sopwith | Aug. 13, 1918 |
| 1,470,004 | Gahm | Oct. 9, 1923 |
| 1,639,371 | Freeman | Aug. 16, 1927 |
| 2,290,464 | Buchheit | July 21, 1942 |
| 2,587,094 | Berg et al. | Feb. 26, 1952 |
| 2,641,305 | Oishei | June 9, 1953 |

FOREIGN PATENTS

| Number | Country | Date |
|---|---|---|
| 525,663 | Great Britain | Sept. 2, 1940 |
| 982,564 | France | Jan. 31, 1951 |